(12) United States Patent
Youssef et al.

(10) Patent No.: US 8,701,911 B2
(45) Date of Patent: Apr. 22, 2014

(54) DEFLECTION RESISTANT ELECTRICAL ENCLOSURE

(75) Inventors: Younes Youssef, Montreal (CA); Adrian Paunescu, Brossard (CA)

(73) Assignee: IPEX Technologies Inc., Mississauga, Ontario (CA)

( * ) Notice: Subject to any disclaimer, the term of this patent is extended or adjusted under 35 U.S.C. 154(b) by 1119 days.

(21) Appl. No.: 12/285,205

(22) Filed: Sep. 30, 2008

(65) Prior Publication Data

US 2010/0078188 A1 Apr. 1, 2010

(30) Foreign Application Priority Data

Sep. 8, 2008 (CA) ...................................... 2639387

(51) Int. Cl.
*B65D 6/28* (2006.01)
*H02G 3/12* (2006.01)

(52) U.S. Cl.
CPC . *H02G 3/121* (2013.01); *H02G 3/12* (2013.01)
USPC ............. 220/4.02; 220/3.4; 220/3.5; 220/3.9; 174/481

(58) Field of Classification Search
USPC ........ 220/3.2, 3.3, 3.4, 3.5, 3.9, 4.02; 174/50, 174/53, 58, 481; 248/906
See application file for complete search history.

(56) References Cited

U.S. PATENT DOCUMENTS

| | | | |
|---|---|---|---|
| 4,896,784 A | 1/1990 | Heath | |
| 5,101,078 A | 3/1992 | Yang | |
| 5,285,009 A | 2/1994 | Bowman | |
| 5,359,152 A * | 10/1994 | Hone-Lin | ........................ 174/53 |
| 5,468,908 A | 11/1995 | Arthur | |
| 5,661,264 A | 8/1997 | Reiker | |
| 5,679,924 A | 10/1997 | Young | |
| 5,700,977 A | 12/1997 | Ford | |
| 5,783,774 A | 7/1998 | Bowman | |
| 5,831,212 A | 11/1998 | Whitehead | |
| 5,853,098 A | 12/1998 | Elder | |
| 5,866,845 A | 2/1999 | Markiewicz | |
| 6,191,361 B1 | 2/2001 | Matty | |
| 6,274,809 B1 | 8/2001 | Pudims | |
| 6,521,833 B1 | 2/2003 | DeFreitas | |
| 6,710,245 B2 | 3/2004 | Roesch | |
| 6,727,429 B1 | 4/2004 | Koessler | |
| 6,838,615 B2 | 1/2005 | Pyron | |
| 6,870,101 B1 * | 3/2005 | Hull et al. | ........................ 174/58 |
| 6,872,884 B2 | 3/2005 | Roesch | |
| 6,894,222 B2 | 5/2005 | Lalancette | |
| D506,183 S | 6/2005 | Hull | |
| 6,908,003 B2 | 6/2005 | Feyes | |
| 6,914,187 B2 | 7/2005 | Hull | |
| 6,953,890 B2 | 10/2005 | Koessler | |
| 6,963,027 B1 | 11/2005 | Williams | |

(Continued)

*Primary Examiner* — Robert J Hicks
*Assistant Examiner* — Kareen Rush

(57) ABSTRACT

An electrical enclosure for use in poured concrete construction having a peripheral wall with opposed longitudinally extending walls longer than opposed laterally extending walls and at least one physical support located substantially midpoint along the opposed longitudinally extended walls to resist deflection of the opposed longitudinal walls caused by the hydraulic pressure of concrete poured around the enclosure. The physical support can be a crossbar extending across the opening of the electrical enclosure with the ends of the crossbar fixed to the longitudinally extending walls. The physical support can also be fastening sleeves extending along at least a portion of the width of the longitudinal walls for receiving elongated fasteners which extend into the concrete form thereby resisting deflection of the opposed longitudinally extending walls.

11 Claims, 9 Drawing Sheets

(56) References Cited

U.S. PATENT DOCUMENTS

| | | | |
|---|---|---|---|
| 6,979,783 B2 | 12/2005 | Weise | |
| 6,998,531 B2 | 2/2006 | Hull | |
| 7,038,130 B2 | 5/2006 | Yip, Jr. | |
| 7,053,297 B2 | 5/2006 | Hull | |
| D523,818 S * | 6/2006 | Roesch et al. | D13/152 |
| 7,057,106 B2 | 6/2006 | Hull | |
| 7,082,728 B1 * | 8/2006 | McConaughy et al. | 52/220.1 |
| 7,109,416 B1 | 9/2006 | Reed | |
| 7,115,813 B2 | 10/2006 | Young | |
| D533,139 S * | 12/2006 | Roesch et al. | D13/152 |
| 7,145,075 B2 | 12/2006 | Hull | |
| 7,173,184 B2 | 2/2007 | Hull | |
| 7,186,913 B2 | 3/2007 | Hull | |
| 7,186,915 B2 | 3/2007 | Hull | |
| D553,093 S * | 10/2007 | Miller | D13/152 |
| 7,572,975 B2 * | 8/2009 | Ruihley | 174/50 |
| 7,628,286 B2 * | 12/2009 | Lalancette | 220/3.7 |
| 2005/0072589 A1 | 4/2005 | Hull | |
| 2005/0092506 A1 | 5/2005 | Hull | |
| 2005/0199621 A1 | 9/2005 | Hull | |
| 2005/0241846 A1 | 11/2005 | Finn, III | |
| 2005/0247474 A1 | 11/2005 | Wiese | |
| 2007/0044986 A1 | 3/2007 | Lalancette | |
| 2007/0074889 A1 | 4/2007 | Dinh | |
| 2007/0079981 A1 | 4/2007 | Dinh | |

* cited by examiner

DEFLECTION RESISTANT ELECTRICAL ENCLOSURE

FIELD OF THE INVENTION

The present invention relates to electrical enclosures, such as an electrical boxes and adapters therefor. More particularly, the present invention relates to electrical enclosures for use in poured concrete construction.

BACKGROUND OF THE INVENTION

It is known in the field to have electrical enclosures for use in poured concrete construction, and other forms of construction, where the electrical enclosures are put in place and connected to other electrical enclosures with electrical non-metallic tubing (ENT) prior to concrete being poured. Concrete is then poured to form the concrete walls of the structure, and, the concrete also forms around the electrical enclosure and the electrical non-metallic tubing (ENT). The electrical enclosures include electrical boxes, sometimes referred to as "electrical mud boxes", and adapters therefor.

Typically, the concrete forms into which the concrete is poured may be several feet high, such as 6 to 10 feet high, representing the height of a concrete wall that is poured at any one time. For example, this may represent the concrete being poured for one level or floor in a building. Because of this height, and because of the density of the concrete, the poured concrete can develop significant hydraulic pressure. This hydraulic pressure acts on the sides of the electrical enclosure and may deflect the side walls of the electrical enclosures. Such a deflection can deform the electrical enclosure thereby limiting or inhibiting its use. Once an electrical enclosure is deflected such that an electrical device cannot fit within the opening, the box is generally no longer salvageable.

It is understood that once the concrete is formed, the electrical enclosure may be used to house switches, electrical receptacles and other components. The electrical enclosure may also be used to house or transport electrical cables or can be used simply as a junction box of various electrical cables travelling through electrical non-metallic tubing (ENT). The electrical enclosure may also be an adapter, such as an adapter to give a double electrical box a smaller opening, and, in this case it is appreciated that the dimensions of the adapter represent a principal characteristic of the enclosure.

In general, electrical enclosures are made of metals, or plastic materials, both of which are sturdy, but not necessarily intended to support large external forces. It is not unusual, because of the hydraulic pressure caused by both the height of the concrete walls, and also the density of the concrete, for the walls of the electrical enclosure to be deflected up to ⅛" on both sides of the electrical enclosure causing a total deformation of up to ¼". It is appreciated that as the electrical enclosure are deflected, their usefulness decreases as it may not be possible to insert the proper components into the electrical enclosure or the electrical enclosure may not be sufficiently large to permit the proper electrical components or cables to be properly housed. It is also appreciated that the proximity of various electrical components within an electrical enclosure is best not to be minimized.

Accordingly, there is a need in the art for an improved electrical enclosure for use with poured concrete, which prevents, or at least resists, deflection while concrete is poured so as to permit easy access to the cavity of the electrical enclosure after the concrete has cured and the forms have been removed.

SUMMARY OF THE INVENTION

Accordingly, it is an object of this invention to at least partially overcome some of the disadvantages of the prior art. Also, it is an object of this invention to provide an improved type of electrical enclosure which resists deflection caused by poured concrete. Accordingly, in one of its aspects, this invention resides in an electrical enclosure for use in poured concrete construction, said electrical enclosure comprising: a peripheral wall defining a cavity, said peripheral wall having opposed longitudinally extending walls and opposed laterally extending walls; at least one physical support located along each opposed longitudinally extending wall to resist deflection of the opposed longitudinally extending walls during pouring of the concrete around said electrical enclosure.

Accordingly, in one embodiment, the present invention provides a crossbar extending across the opening of an electrical enclosure to create a physical lateral support resisting deflection of the longitudinal walls. The crossbar, in one embodiment, is formed in an adapter, but could also be formed in an electrical box. The crossbar advantageously is integrally formed with the electrical enclosure to thereby resist lateral movement of the longitudinally extending walls, and, simplify use in the field.

In a further embodiment, the physical supports comprise fastener sleeves extending along at least a portion of the width of the longitudinal walls, either on the outside or inside of the walls. The sleeves may receive an elongated fastener which can extend into the concrete form. In this way, the elongated fasteners will both fix the electrical enclosure to the form, as well as provide lateral support for the longitudinally extending walls at substantially the midpoint thereof to resist deflection. Additional fastening sleeves may be located at other locations along the peripheral wall to affix the electrical enclosure to the form. More preferably, the fastener sleeves have an opening for receiving the fasteners, which openings are substantially flush with the rear surface of the enclosure to facilitate insertion of the elongated fastener member.

Further aspects of the invention will become apparent upon reading the following detailed description and drawings, which illustrate the invention and preferred embodiments of the invention.

BRIEF DESCRIPTION OF THE DRAWINGS

In the drawings, which illustrate embodiments of the invention.

DETAILED DESCRIPTION OF THE PREFERRED EMBODIMENTS

Preferred embodiments of the invention and its advantages can be understood by referring to the present drawings. In the present drawings, like numerals are used for like and corresponding parts of the accompanying drawings.

Figure 1:
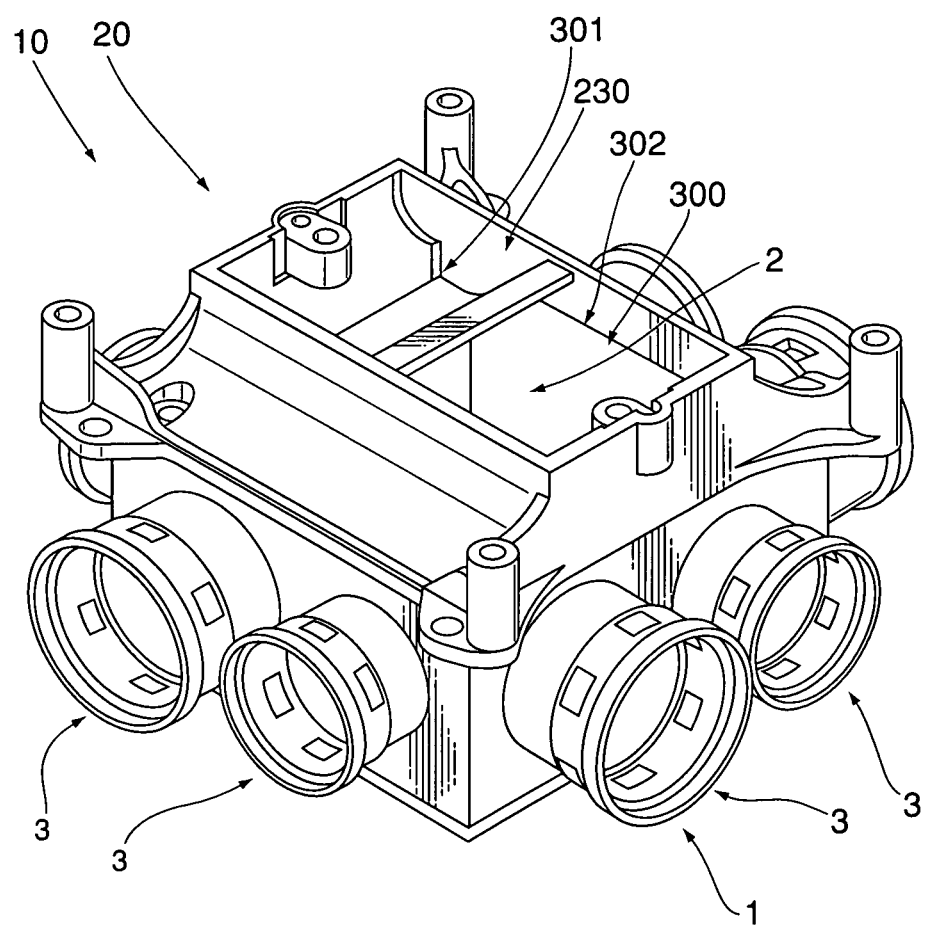
FIG. 1 shows an electrical enclosure according to one embodiment of the present invention which, in this embodiment, is an adapter mating with an electrical box.

As shown in FIG. 1, one embodiment of the present invention relates to an electrical enclosure, shown generally by reference numeral 10 in FIG. 1. In this embodiment, the electrical enclosure 10 is an adapter 20. However, it is understood that the electrical enclosure 10 of this invention is not restricted to an adapter 20, but can be any other type of electrical enclosure 10. As illustrated in FIG. 1, in the case where the electrical enclosure 10 is an adapter 20, it may be adapted to engage with an opening 2 of a box body, shown generally by reference numeral 1 in FIG. 1. As illustrated in FIG. 1, the adapter 20 has opening 300 which, in this embodiment, corresponds to the opening size of a single gang box. It is understood that in this context, a single gang box refers to an opening size to fit a single electrical element, such as one receptacle or one switch, according to current building standards and building codes in North America. It is also understood that different sized openings 300 can be used depending on the application as well as the jurisdiction and the corresponding building codes, and, that these may change over time.

Figure 4:
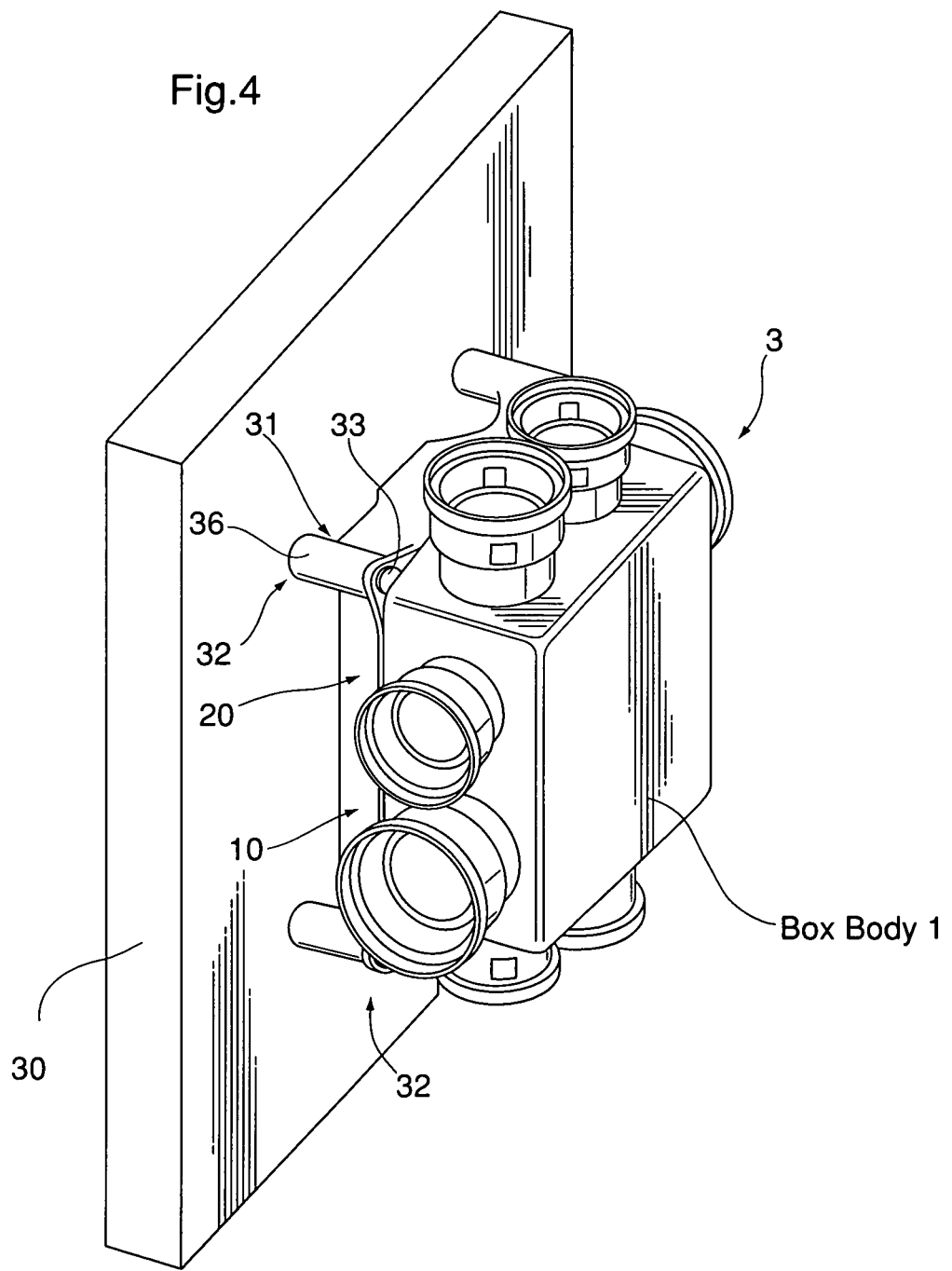
FIG. 4 shows an adapter electrical enclosure according to one embodiment of the present invention engaged to a box body and attached to a form.

The electrical box body 1 in FIG. 1 is a double electrical box body integrally formed ENT connector openings 3. It is understood that ENT (not shown) would be attached to the openings 3 when the adapter 20 and electrical box body 1 are attached to a form 30 as shown in FIG. 4, and, the openings 3 may have knock out plastic covers (not shown) as is known in the art which may be removed to permit communication between the ENT and the box body 1.

Figure 2:
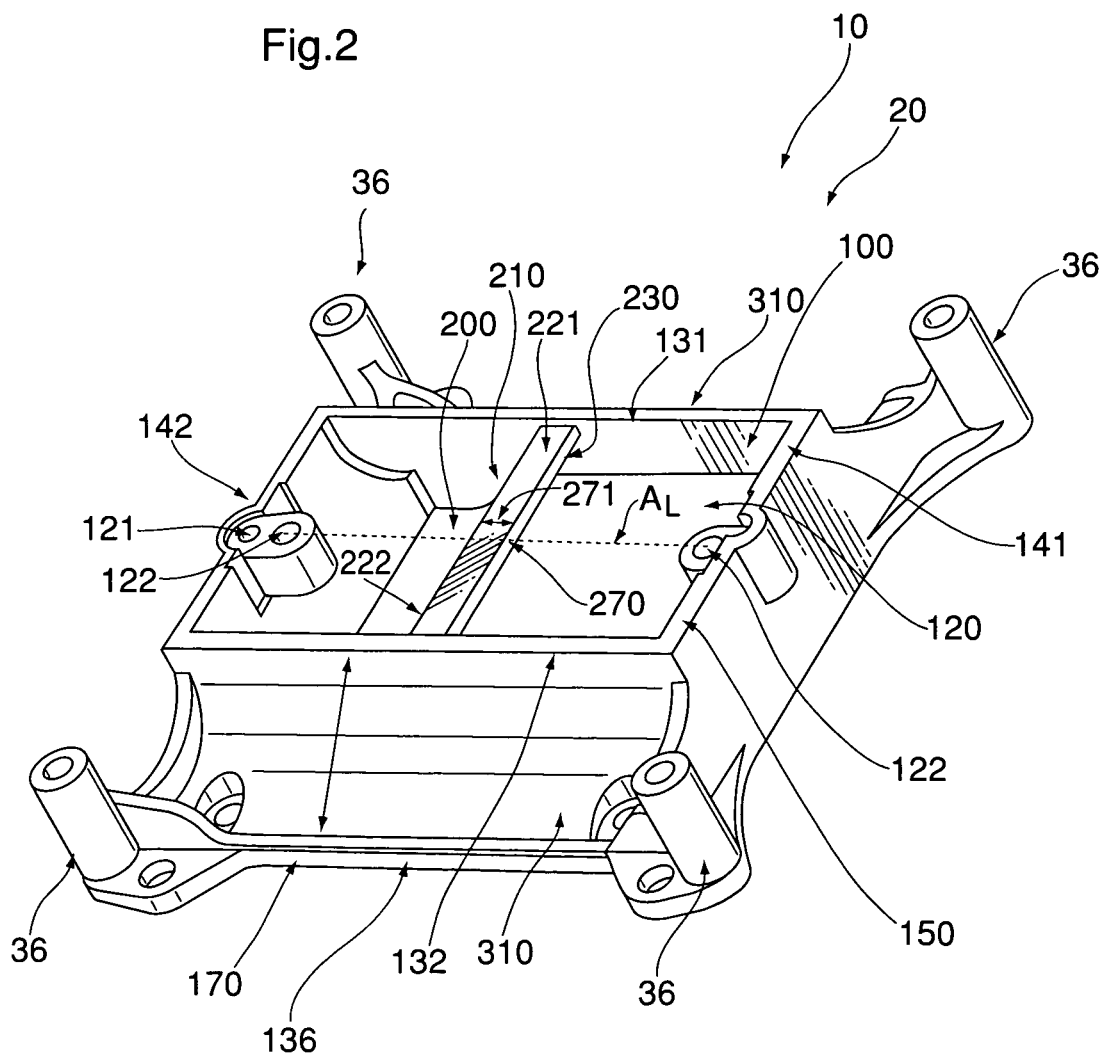
FIG. 2 shows a front elevational view of the adapter electrical enclosure shown in FIG. 1.

FIG. 2 shows the electrical enclosure 10 according to this embodiment of the invention in more detail. As shown in FIG. 2, the electrical enclosure 10, which in this case is an adapter 20, has a peripheral wall 100 which extends around the opening 300. The peripheral wall 100 defines a cavity 120. The cavity 120, in this case, has opening 300 on the front surface 150 and an opening 301 in the rear surface 160. It is understood that in alternate embodiments, the cavity 120 may be closed and not have an opening in the rear surface 160.

The adapter 20 also comprises at least one physical support, identified generally by reference numeral 200 in FIG. 2, along each of the opposed longitudinally extending walls 131, 132. Preferably, the at least one physical support 200 is located substantially midpoint, as shown by the dashed lines 136, 137 in FIGS. 2 and 3, along each longitudinally extending wall 131, 132. In a preferred embodiment, the at least one physical support 200 comprises a member 210 having opposed ends 221, 222. Each of the ends, 221, 222 is fixed to a corresponding opposed longitudinal wall 131, 132 at substantially midpoint 136, 137 along each opposed longitudinal wall 131, 132 to better prevent internal deflection of opposed longitudinal walls 131, 132. The member 210 may be any physical member which resists deflection of the opposed longitudinal extending walls 131, 132. In this preferred embodiment, the member 210 can be any physical device located within the opening 300 of the electrical enclosure 10 to prevent internal deflection of the opposed longitudinal walls 131, 132.

In a further preferred embodiment, the member 210 extends from one opposed longitudinal wall 131 to the other longitudinal wall 132 in a direction substantially perpendicular to the longitudinal wall 131, 132 as illustrated, for instance, in FIG. 2. It is appreciated that this may be the most efficient shape the member 210 may take because it passes directly across the opening 300. However, other shapes, such as triangular, oval, U-shaped or diamond shaped could also be used depending on the application and to best accommodate the electrical component to be inserted in the cavity 120 of the enclosure 10.

The shape of the member 210 is also selected so as to resist deflection of the opposed longitudinally extending walls 131, 132. It is also understood that after the concrete has been poured and it has hardened, the hydraulic pressure will essentially cease. At this point, the member 210 can be removed, such as by breaking, cutting, burning or melting the member 210 from the electrical enclosure 10. Therefore, the shape of the member 210 need not affect the later use of the enclosure 10. The shape of the member 210 also need not affect insertion of an electrical element into the electrical enclosure 10.

Preferably, the member 210 is integrally formed with the electrical enclosure 10. In a further preferred embodiment, the member 210 and the electrical enclosure 10 are moulded of plastic material. Still more preferably, the member 210 is formed by the same mould at the same time that the adapter 10 is made.

Figure 3:
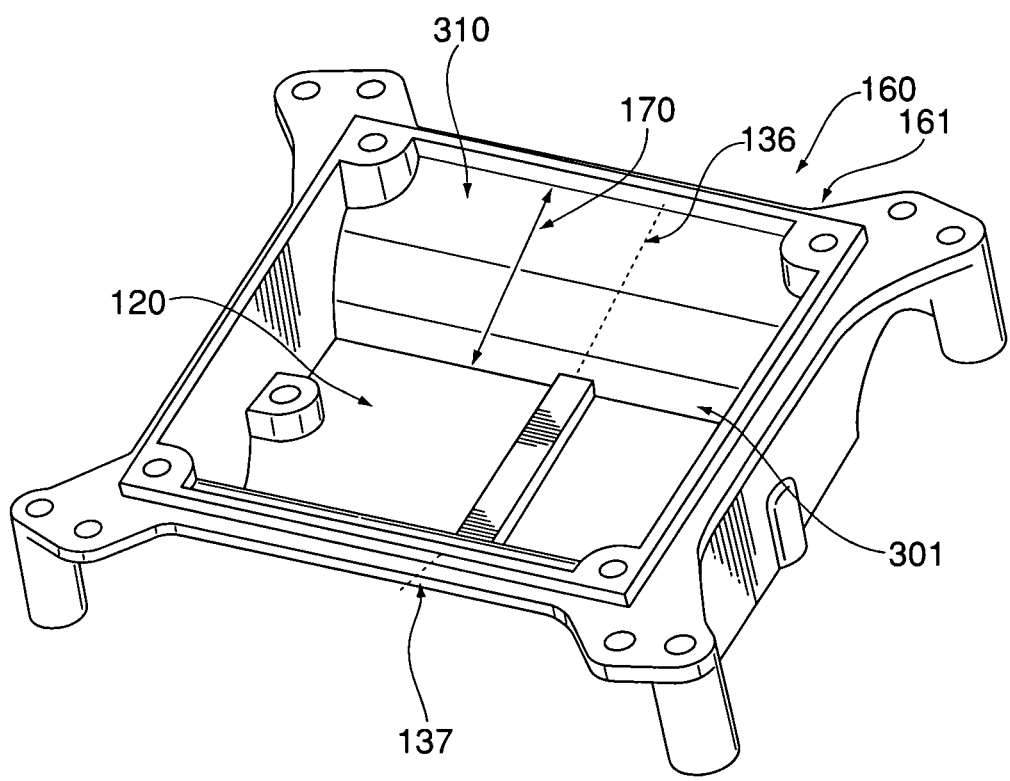
FIG. 3 shows a rear elevational view of the adapter electrical enclosure shown in FIG. 1.

In a further preferred embodiment, the member 210 may be a crossbar, illustrated by reference numeral 230 in FIG. 2. The crossbar 230 can be in the shape of a bar extending across the opening 300 as illustrated in FIGS. 2 and 3. In this preferred embodiment, the crossbar has a crossbar thickness 270 and a crossbar width 271.

The peripheral wall 100 preferably has opposed longitudinally extending walls 131 and 132. The opposed longitudinal walls, in this embodiment, are longer than the opposed lateral walls 141, 142. As illustrated in FIG. 2, the adapter opening 300 may be rectangular in shape such that the longitudinal walls 131, 132 are longer than the shorter lateral walls 141, 142.

Bosses 121 may project inwardly of the cavity 120 to facilitate fastening of the switches, receptacles and other components within the enclosure 10. The bosses 121 preferably project from the lateral walls 141, 142 and are aligned on a longitudinal axis $A_L$, which intersects the crossbar 230. The bosses 121 have fastener receiving holes 122 to receive the fasteners (not shown) that attach a switch, receptacle or other component within the enclosure 10. The fasteners (not shown) may be nails, screws or other fasteners which can mate with the holes 122.

In general, the bosses 121 for fastening the electrical components are located on the lateral walls 141, 142. Accordingly, in this embodiment, it is preferred that the member 210 is not located on the lateral walls 141, 142 so as not to interfere with the bosses 121. This will also lessen the interference of the member 210 with the insertion of electrical components into the enclosure after the concrete has been poured.

As illustrated in FIGS. 2 and 3, the opposed longitudinal walls 131, 132 have a wall width, illustrated generally by reference numeral 170, which separate the front surface 150 (FIG. 2) from the rear surface 160 (FIG. 3). The rear surface 160 may optionally have a raised ridge 161, or other element, which facilitates the engagement of the adapter 20 to the electrical box 1. As also illustrated in FIGS. 2 and 3, the crossbar 230 has a thickness 270, which is preferably less than the wall width 170 of the longitudinal walls 131, 132. As also illustrated in FIGS. 2 and 3, the crossbar 230 is nearer the front surface 150 than the rear surface 160. This is preferred, for example, because more of the hydraulic force from the poured concrete would tend to apply to the front surface 150 than the rear surface 160. In particular, in the case where the electrical enclosure 10 is an adapter 20, the rear surface 160 may be much larger in shape, thereby decreasing the hydraulic force. The adapter 20 may have raised ridges 161 to engage the opening 2 and which raised ridges 161 further support the rear surface 160. Furthermore, as illustrated in FIG. 2, the opposed longitudinal walls 131, 132 may have concave sloping surfaces 310 along the wall width 170 to adapt the double gang electrical box opening 2 to the single gang box opening 300. These concave sloping surfaces 310 may also assist in redirecting the hydraulic forces due to their concave shapes.

As illustrated in FIGS. 1 and 2, the crossbar 230 is situated across the single gang box opening 300 substantially midpoint 136 the opposed longitudinally extending walls 131, 132. This defines a first front entrance opening 301 and a second front entrance opening 302 at the front surface 150. The first front entrance opening 301 and the second front entrance opening 302 are separated by the member 210 which, in this preferred embodiment, is the crossbar 230. The first front entrance opening 301 and the second front entrance opening 302 may also have a removable cover (not shown) which prevents entry of concrete and other building products, and also dirt, into the cavity 120. The removable covers may be removed after the concrete has been poured leaving the crossbar 230 extending between the opposed longitudinal walls 131, 132. The crossbar 230 may also be removed, such as by cutting, breaking, burning or melting after the concrete has been poured and it has hardened.

FIG. 4 illustrates the electrical enclosure 10 which, in this embodiment, is the adapter 20 assembled with the electrical box 1 and attached to a form 30. In this embodiment, the adapter 20 is attached to the form 30 using elongated fasteners 31 passing through fastener sleeves 32. In a preferred embodiment, as illustrated in FIG. 4, the elongated fasteners 31 are nails 33 and the fastener sleeves 32 are nail sleeves 36 through which the nails 33 pass into the form 30.

The ENT connector openings 3 of the box body 1 are also shown in FIG. 4. While not illustrated in FIG. 4, it is understood that one or more ENTs (not shown) would extend from one or more of the openings 3. Once all other building requirements have been addressed, including reinforcing bars and any other structural elements that must be in place, concrete will be poured into the spaces created by form 30 and, corresponding forms (not shown) to create a concrete wall. During pouring of the concrete, the at least one physical element 200, which in this embodiment comprises the crossbar 230, will resist deflection of the longitudinal walls 131, 132. After the concrete has been cured, the form 30 will be removed exposing the opening 300.

Figure 5:
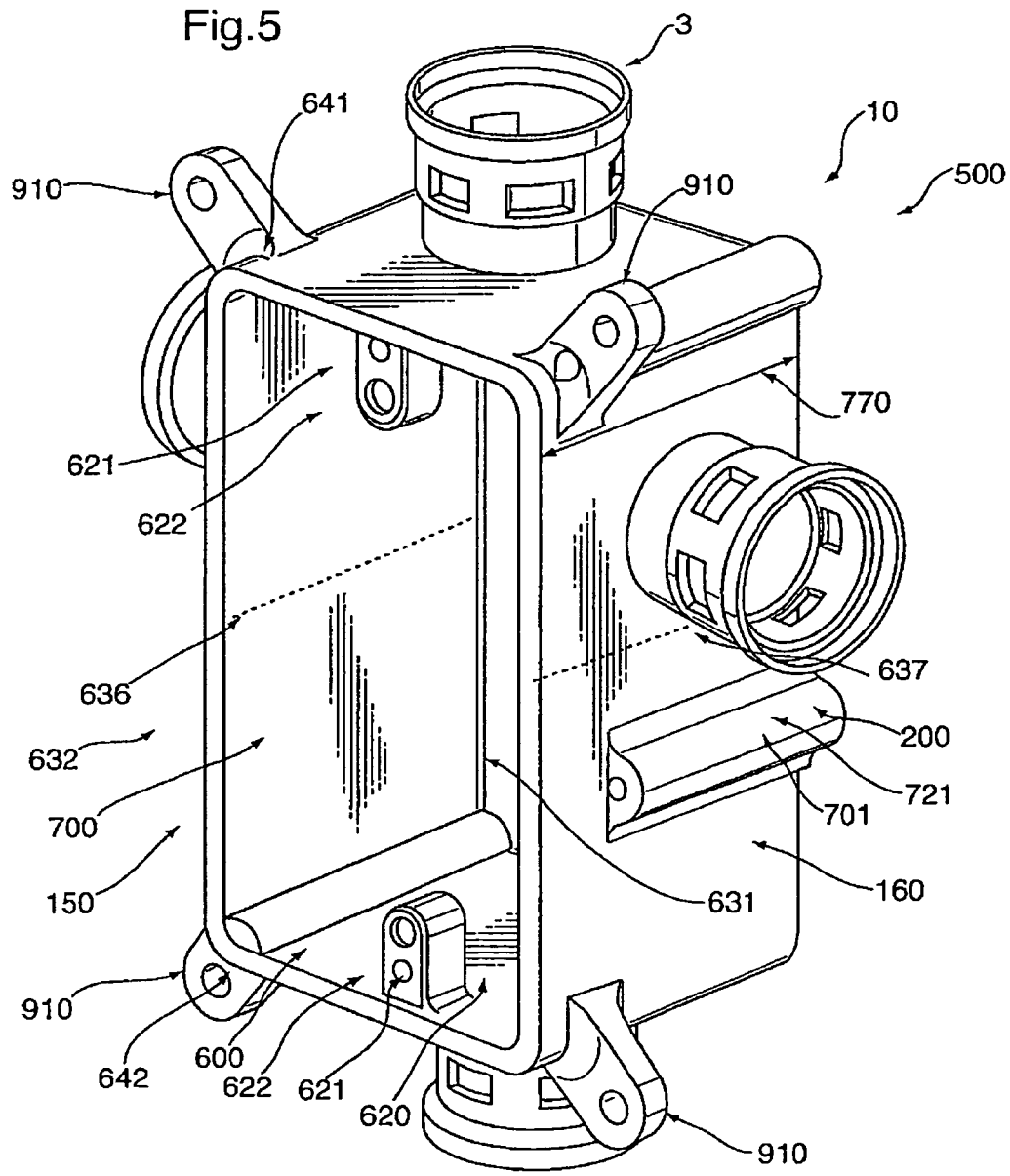
FIG. 5 shows a front perspective view of an electrical enclosure according to a further embodiment of the present invention which, in this embodiment, is an electrical box.
Figure 6:
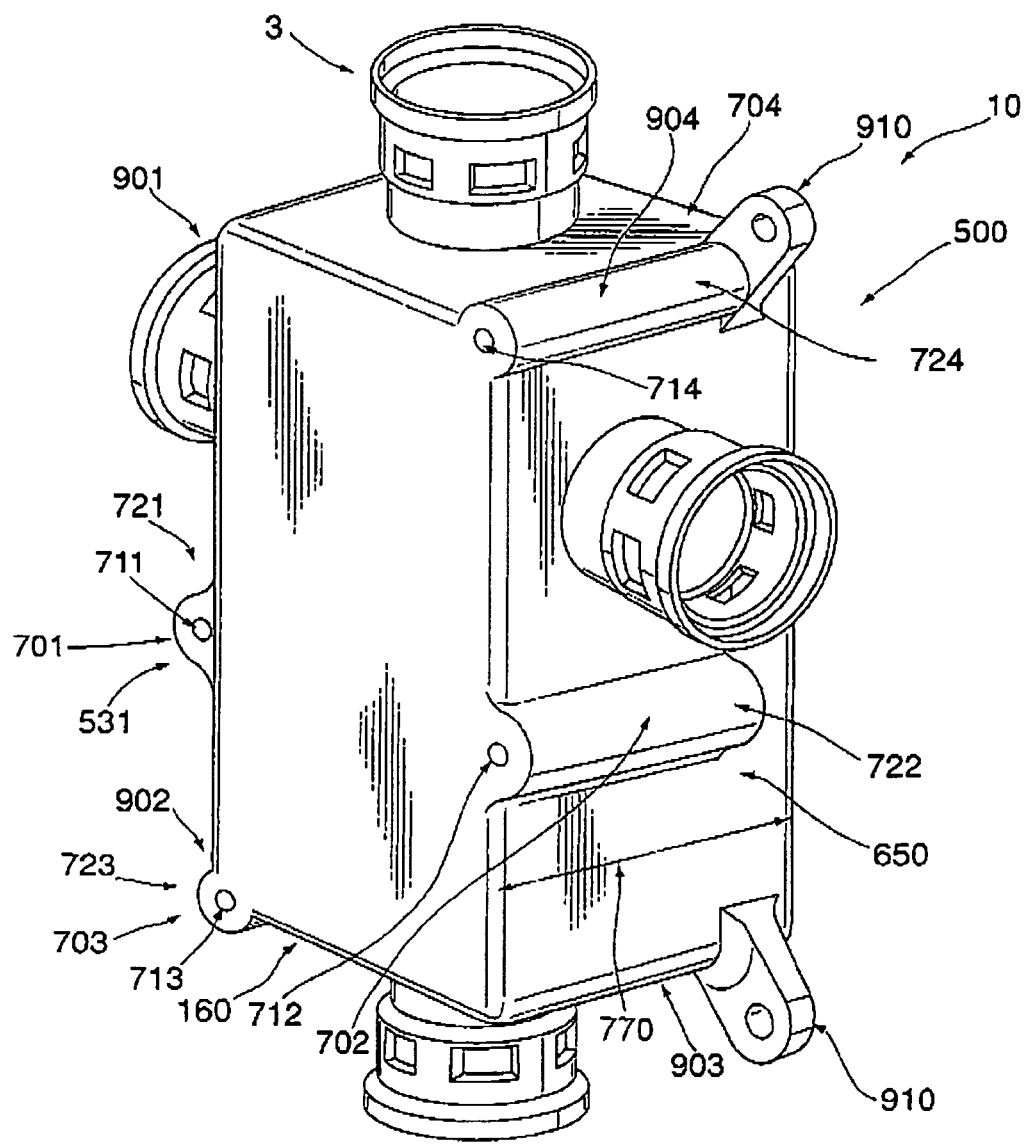
FIG. 6 shows a rear elevational view of the electrical enclosure, shown in FIG. 5.

FIG. 5 shows an alternate embodiment of the electrical enclosure 10 which, in this case, is an electrical box body shown generally by reference numeral 500. More specifically, the electrical box body 500 is a single gang box meaning that it is sized to fit a single electrical element. As stated above, with respect to the adapter 20, the single gang box body 500 may have various dimensions depending on the jurisdiction and the building codes and electrical codes in effect in the particular jurisdiction and at the particular time. Furthermore, as illustrated in FIGS. 5 and 6, the electrical box body 500 has a front surface 150 with an opening 700 and a rear surface 160 which is enclosed. The electrical box body 500 also may have ENT connectors 3 as discussed above.

As illustrated in FIG. 5, the enclosure 10 according to this embodiment has peripheral walls 600 which define a cavity 620. The peripheral walls 600 have opposed first and second longitudinally extending walls 631, 632 and opposed laterally extending walls 641, 642. Bosses 621 project inwardly to the cavity 620 from each of the laterally extending walls 641, 642. The bosses 621 have holes 622 to receive fasteners (not shown) that fasten electrical elements, such as switches or receptacles, within the enclosure 10 as discussed above with respect to the bosses 121.

The longitudinal walls 631, 632 and the lateral walls 641, 642 intersect at intersections shown generally by reference numerals 901, 902, 903 and 904 in FIG. 6. Each of the intersections 901, 902, 903 and 904 also have ear tabs 910 extending diagonally therefrom for facilitating fastening of the electrical box 500 into position.

Figure 7:
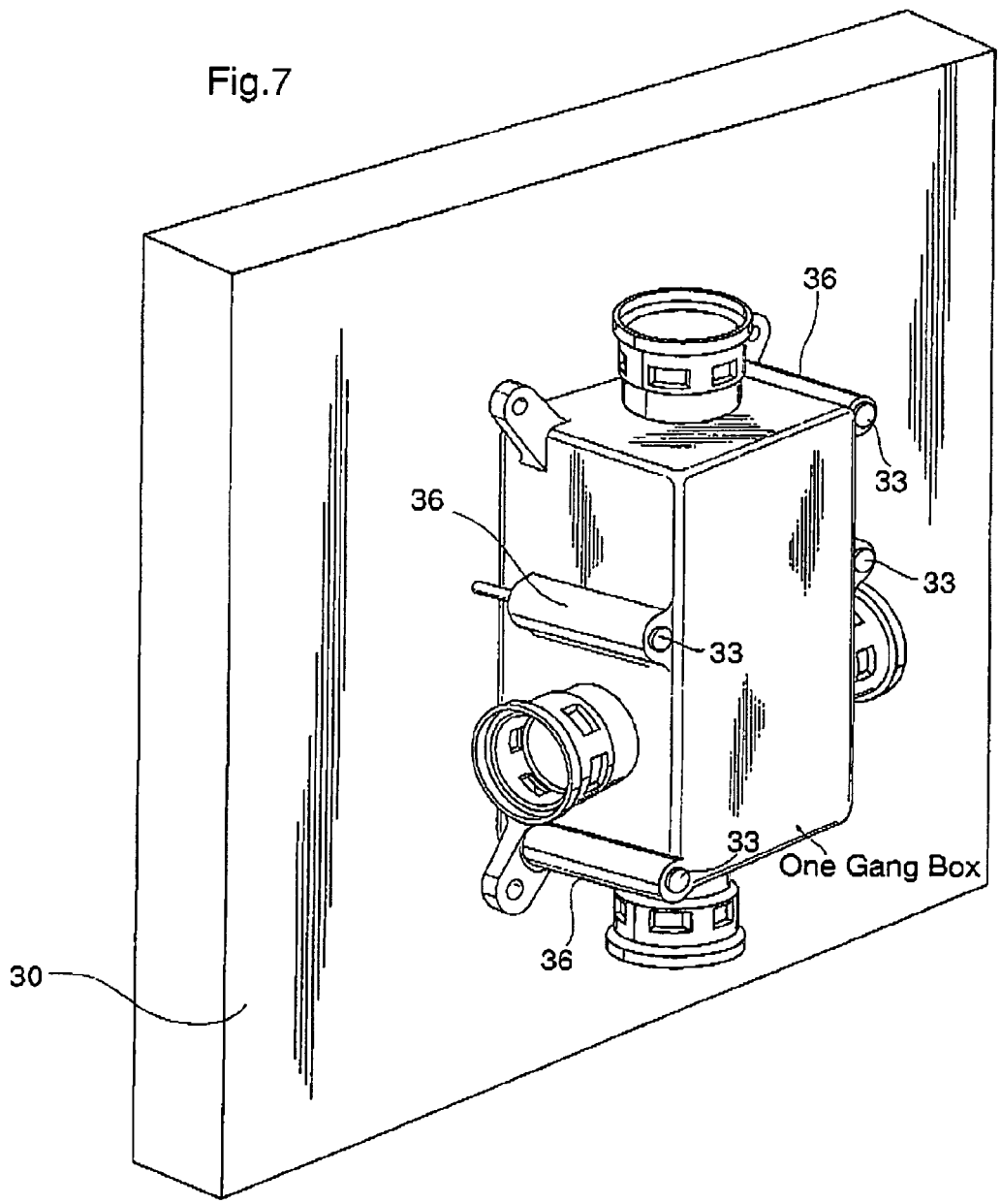
FIG. 7 shows the electrical enclosure shown in FIGS. 5 and 6 installed on a form using elongated fasteners according to one embodiment of the present invention.

The longitudinally extending walls 631, 632 have midpoints shown by dashed lines 636, 637 in FIGS. 5 and 6. The longitudinally extending walls also have a width, shown generally by reference numeral 770, which separates the front surface 150 from the rear surface 160. In this embodiment, the at least one physical support 200 comprises a first fastening mechanism, represented by reference numeral 701 located along the first longitudinal wall 631 and a second fastening mechanism 702 located along the second longitudinally extending wall 632. The first and second fastening mechanisms 701, 702 are preferably located at substantially the midpoint 636, 637 of the longitudinally extending walls 631, 632. The first and second fastening mechanism 701, 702 fasten the first longitudinal wall 631 and a second longitudinal wall 632, respectively, to the concrete form 30 as illustrated in FIG. 7. In this way, the first and second fastening mechanism 701, 702 fasten the longitudinal walls 631, 632 to the form 30 substantially at the midpoint 636, 637 and thereby resist deflection of the longitudinal walls 631, 632 during pouring of the concrete around the electrical enclosure 10.

In a preferred embodiment, the first fastening mechanism 701 comprises a first fastener sleeve 721, which extends along at least a portion of the width 770 of the first longitudinal wall 631. The second fastening mechanism 702 preferably comprises a second fastener sleeve 722 extending along at least a portion of the width 770 of the second longitudinal wall 632. The first and second fastener sleeves 721, 722 receive first and second elongated fasteners, illustrated generally by reference numeral 531 in FIG. 6, which pass through the fastener sleeves 721, 722 and extend into the form 30. The elongated fasteners 531 will generally be forced into the form 30. The fasteners 531 pass through the fastener sleeves 721, 722 and extending into the form 30 to resist deflection of the opposed longitudinally extending wall 631, 632 by laterally supporting the first and second longitudinal walls 631, 632 at substantially their midpoint 636, 637. This is illustrated, for instance, in FIG. 7 where the elongated members 531 are shown inserted into the first and second fastener sleeves 721, 722.

As best illustrated in FIG. 6, the first fastener sleeve 721 has a first fastener opening 711 for receiving the elongated fastener 531. In a preferred embodiment, the first fastener opening 711 is substantially flush with the rear surface 160. This facilitates the quick insertion of the elongated member 531 into the first opening 711. Also, it is preferable that the first fastener sleeve 721 extends from the rear surface 160 for a distance which is greater than one half of the width 770 of the first longitudinal opening 636. It is preferred that the first fastener sleeve 721 does not extend completely to the front surface 150 in order to avoid the appearance of the first fastener sleeve when the form 30 is removed. As illustrated in FIGS. 5, 6 and 7, it is also preferred that the first fastener sleeve 721 extend in a direction perpendicular to the direction of the first longitudinal wall 631. As also illustrated in FIGS. 5, 6 and 7, the fastener sleeve 721 is oriented on the outer surface 650 of the box body 500. In this way, sleeve 721 does not occupy space in the cavity 620 that could be used to house electrical components and cables.

The second fastener sleeve 722 has a similar construction to the first fastener sleeve 721. In particular, the second fastener sleeve 721 extends from the rear surface 160 for a distance greater than one half the width 770 of the second longitudinal wall. Furthermore, the second fastener sleeve 722 comprises a second fastener opening 712 for receiving a further elongated fastener 531. The second fastener opening 712 is also preferably substantially flush with the rear surface 160 to facilitate entry of the elongated member to the second fastener opening 712. Furthermore, it is preferred that the fastener sleeve 722 does not extend to the front surface 150 in order to provide a smaller profile to the form 300 when it is removed. In a further preferred embodiment, the second fastener sleeve 722 extends perpendicularly to the second longitudinal wall 632 and is oriented on the outer surface 650 of the box 500.

It is possible that the electrical box body 500 may be securely fastened to the form 300 merely with the elongated members 531 in the first and second fastener sleeves 721, 722. However, in a preferred embodiment, additional fastener sleeves 723, 724 are provided. These third and fourth fastener sleeves 723, 724 are located along the peripheral wall 600 and have openings 713, 714, which are flush with the rear surface 160 also to facilitate receiving additional elongated fasteners 531, as shown best in FIG. 7. In a further preferred embodiment, the third and fourth fastener sleeves 723, 724 are each located at one of the four intersections 901, 902, 903, 904. More preferably, the third and fourth fastener sleeves 723, 724 are located at diagonally opposed intersections 902, 904 as shown in FIGS. 6 and 7. This is done to more securely fix the electrical box body 500 to the form 30 by having the sleeves 721, 722, 723, 724 at distant positions along the peripheral wall 600. This also facilitates resisting any torque that may be applied to the electrical box body 500. As also illustrated in FIG. 6, when the third and fourth fastener sleeves 723, 724 are located at on or more of the intersections 901, 902, 903, 904, the sleeves 723, 724 will also be integrally formed with at least two of the ear tabs 910.

Figure 8:
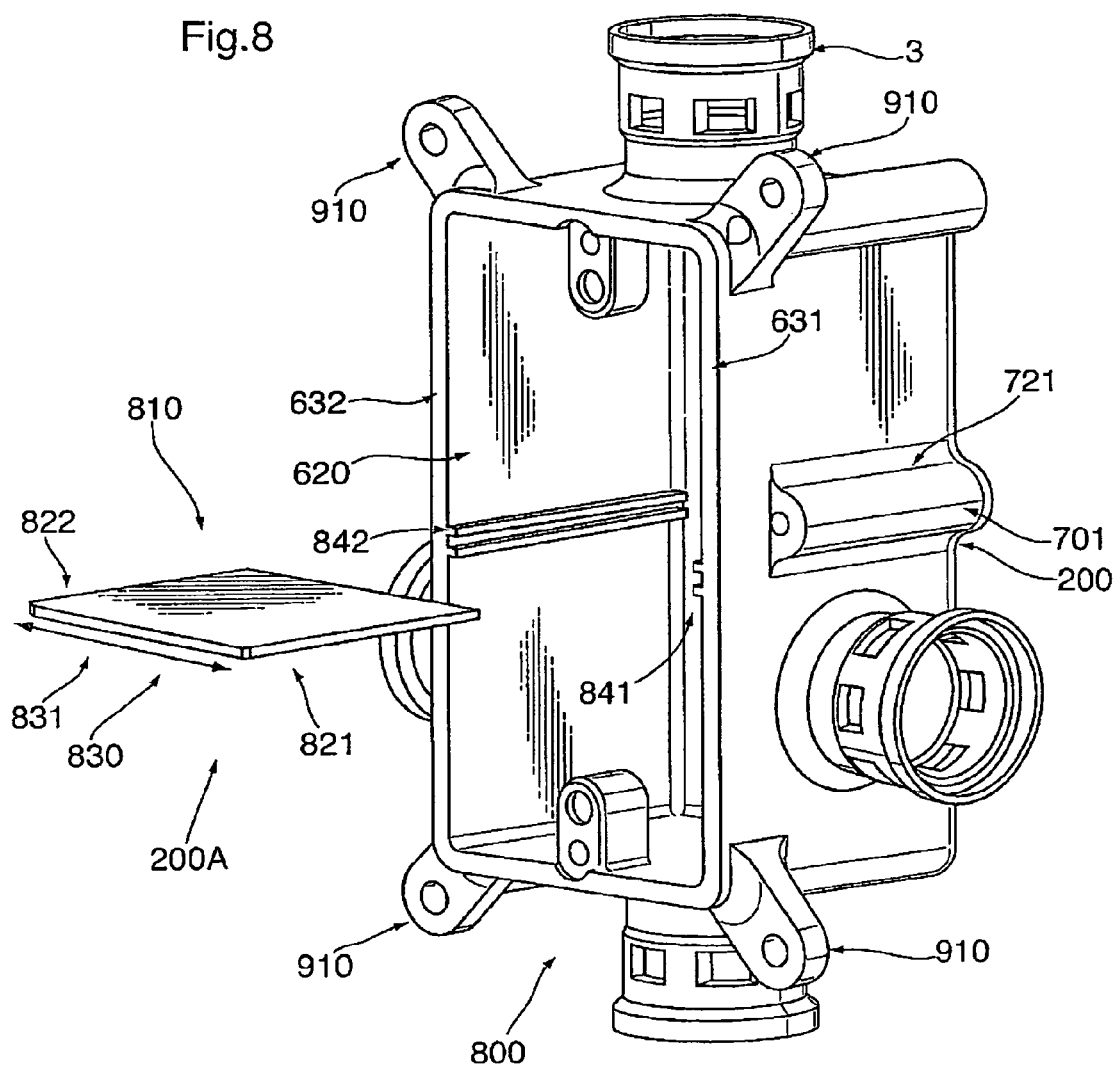
FIG. 8 shows a perspective view of an electrical enclosure according to a further embodiment of the present invention.

FIG. 8 shows a further embodiment of the present invention having two physical supports, identified by reference numerals 200 and 200A. The at least one physical support 200 corresponds to the fastening mechanisms 701 and 702 (not shown in FIG. 8) discussed above. The further physical support 200A comprises a movable member, shown generally by reference numeral 810. The movable member 810 is movable to and from an inserted position in the cavity 620 of the electrical enclosure 800 shown in FIG. 9. It is understood that the movable member 810 need not necessarily be used in conjunction with the fastening mechanism 701, 702 and each of the at least one physical supports 200, 200A may be used individually or together.

Figure 9:
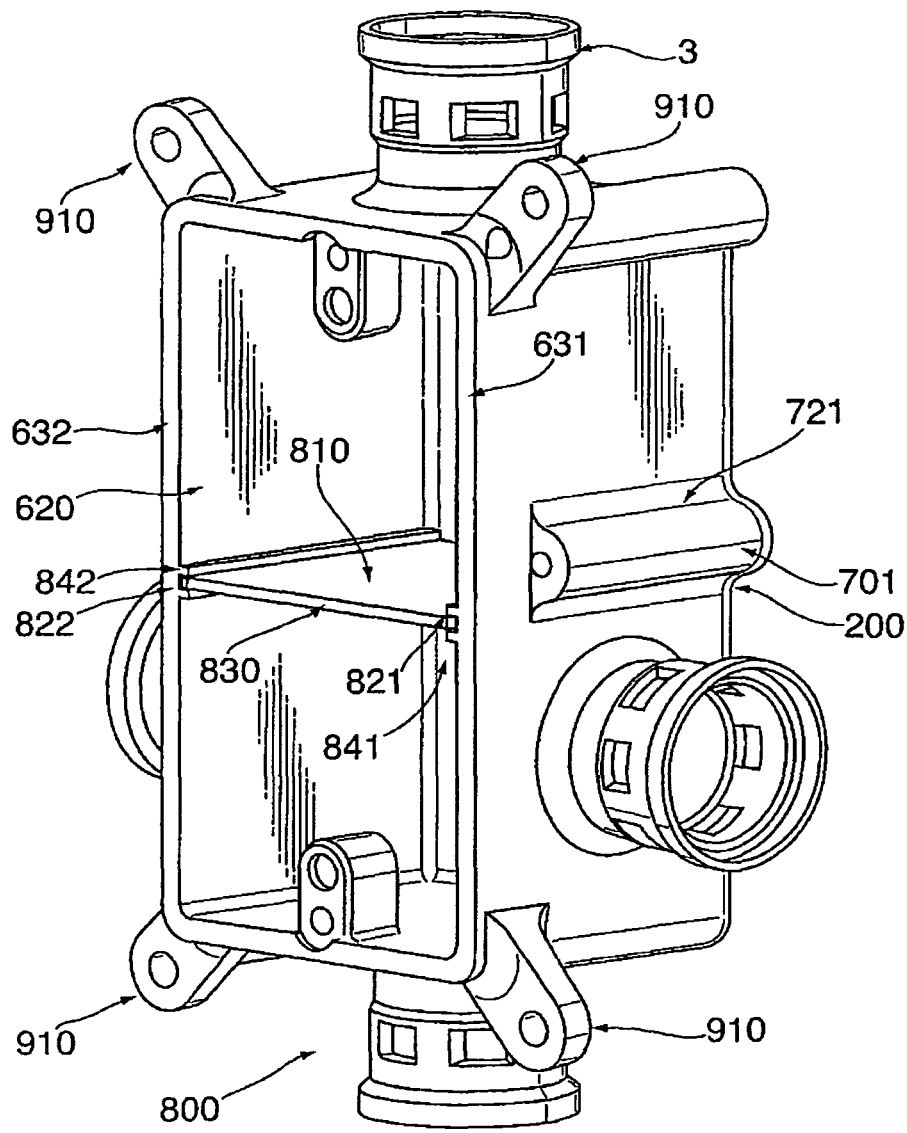
FIG. 9 shows a perspective view of the electrical enclosure shown in FIG. 8 with the movable member in the inserted position.

As also illustrated in FIG. 8, the movable member 810 may have opposed ends 821, 822. When the movable member 810 is in the inserted position (shown in FIG. 9), the opposed ends 821, 822 interact with the opposed walls 631, 632 to resist deflection of the opposed longitudinally extending walls 631, 632 during pouring of the concrete. The movable member 810 may have any shape, such as circular, oval, spherical, egg-shaped or cubical, which can resist deflection of the opposed longitudinally extending walls 631, 632. In a preferred embodiment, the movable member 810 is a movable plate, as shown generally by reference numeral 830, having a width 831 which approximately corresponds to the width of the cavity 632. To facilitate insertion and removal of the movable member 810 to and from the cavity 620, at least one longitudinal wall 631, 632 will have a channel, identified by reference numerals 841, 842, for receiving the movable plate 830. In this way, the movable plate 830 may be inserted into the inserted position during manufacture, or at least, before the concrete is poured, and, can then be removed from the inserted position after the concrete has been hardened. FIGS. 8 and 9 also illustrate the other components of the electrical enclosure 10 similar to that discussed with respect to the other embodiment. It is understood that these other components perform a similar function in this embodiment and will not be discussed in further detail at this time.

It is also understood that reference to "concrete" throughout this specification refers to any type of building material which is used to construct buildings by flowing a material which can then be cured or otherwise hardened. It is understood that the term "concrete" is not restricted to any one type of building material, but rather, as used in this specification, would refer to any type of building material for structures now in existence or which may be developed in this future for this function.

It is also understood that the elongated fasteners can be any type of fastener that can pass through the sleeves 721, 722 and attach the box 500 to the form 30. In particular, the elongated fasteners 531 may be nails, screws, or any other type of fastener.

To the extent that a patentee may act as its own lexicographer under applicable law, it is hereby further directed that all words appearing in the claims section, except for the above defined words, shall take on their ordinary, plain and accustomed meanings (as generally evidenced, inter alia, by dictionaries and/or technical lexicons), and shall not be considered to be specially defined in this specification. Notwithstanding this limitation on the inference of "special definitions," the specification may be used to evidence the appropriate, ordinary, plain and accustomed meanings (as generally evidenced, inter alia, by dictionaries and/or technical lexicons), in the situation where a word or term used in the claims has more than one pre-established meaning and the specification is helpful in choosing between the alternatives.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments, which are functional, electrical or mechanical equivalents of the specific embodiments and features that have been described and illustrated herein.

The embodiments of the invention in which an exclusive property or privilege is claimed are defined as follows:

1. An electrical enclosure for use in poured concrete construction, said electrical enclosure comprising:
    a peripheral wall defining a cavity, said peripheral wall having opposed longitudinally extending walls and opposed laterally extending walls and having a front surface and a rear surface;

at least one physical support located along each opposed longitudinally extending wall to resist deflection of the opposed longitudinally extending walls during pouring of the concrete around said electrical enclosure, said at least one physical support comprising a first fastening mechanism for fastening a first one of the longitudinally extending walls at substantially its midpoint to a concrete form, and, a second fastening mechanism for fastening a second one of the longitudinally extending walls at substantially its midpoint to the concrete form, the first fastening mechanism comprising a first fastener sleeve extending from the rear surface for a distance greater than one half the width of the first longitudinal wall, but less than the width of the first longitudinal wall, and, the second fastening mechanism comprising a second fastener sleeve extending from the rear surface for a distance greater than one half the width of the second longitudinal wall, but less than the width of the second longitudinal wall, said first and second fastener sleeves receiving first and second elongated fasteners, respectively, said first fastener sleeve having a first fastener opening for receiving the first elongated fastener, said first fastener opening being substantially flush with the rear surface, and, the second fastener sleeve comprises a second fastener opening for receiving the second elongated fastener, said second fastener opening being substantially flush with the rear surface, said elongated fasteners are passed through the corresponding fastener sleeves and into the form to resist deflection of the opposed longitudinally extending walls by laterally supporting the first and second longitudinal walls at substantially their midpoint;

a third fastening mechanism comprising a third fastener sleeve located along the peripheral wall, said third fastener sleeve having a third opening substantially flush with the rear surface for receiving a third elongated fastener.

2. The electrical enclosure as defined in claim 1 wherein said enclosure is moulded of plastic material.

3. The electrical enclosure as defined in claim 1 further comprising fastening bosses projecting into the cavity from the lateral walls for fastening an electrical component to be housed in the electrical enclosure.

4. The electrical enclosure as defined in claim 1 wherein the opposed longitudinal walls are longer than the opposed lateral walls.

5. The electrical enclosure as defined in claim 1 further comprising a fourth fastening mechanism comprising a fourth fastener sleeve located along the peripheral wall, said fourth fastener sleeve having a fourth opening substantially flush with the rear surface for receiving a fourth elongated fastener; and wherein the third fastener sleeves and the fourth fastener sleeve are located at intersections of the lateral walls and the longitudinal walls.

6. The electrical enclosure as defined in claim 5 further comprising ear tabs extending diagonally from each of the intersections; and wherein at least one ear tab is integrally formed with the third fastener sleeve.

7. The electrical enclosure as defined in claim 1 wherein the enclosure is an electrical box body and the rear surface is enclosed.

8. The electrical enclosure as defined in claim 1 wherein said first and second fastening mechanisms are located externally of the cavity.

9. The electrical enclosure as defined in claim 1 wherein the at least one physical support further comprises a movable member having opposed ends movable to and from an inserted position wherein the opposed ends interact with the opposed longitudinally extending walls to resist deflection of the opposed longitudinally extending walls, in addition to the first fastening mechanism for fastening a first one of the longitudinally extending walls to a concrete form, and, the second fastening mechanism for fastening a second one of the longitudinally extending walls to a concrete form, said first and second fastening mechanisms being located externally of the cavity, and, along the first and second longitudinally extending walls, respectively.

10. The electrical enclosure as defined in claim 9 wherein the movable member comprises a plate having opposed ends, said plate being insertable into the cavity between the opposed longitudinally extending walls, said opposed ends of the plate interacting with the opposed longitudinally extending walls to resist deflection thereof.

11. The electrical enclosure as defined in claim 10 wherein at least one of the longitudinally extending walls comprises a channel for receiving one of the opposed ends of the movable plate; and wherein said at least one channel is located internally of the cavity, and, the movable plate is inserted into the cavity by sliding the one of the opposed ends of the plate along the at least one channel to the inserted position, and, wherein at the inserted position, the opposed ends of the movable plate abut the longitudinally extending walls to resist deflection thereof.

\* \* \* \* \*